United States Patent
Azra

(10) Patent No.: US 11,600,827 B2
(45) Date of Patent: Mar. 7, 2023

(54) ALKALINE MEMBRANE FUEL CELL ASSEMBLY COMPRISING A THIN MEMBRANE AND METHOD OF MAKING SAME

(71) Applicant: HYDROLITE LTD, Caesarea (IL)

(72) Inventor: Charly David Azra, Harish (IL)

(73) Assignee: HYDROLITE LTD, Caesarea (IL)

( * ) Notice: Subject to any disclaimer, the term of this patent is extended or adjusted under 35 U.S.C. 154(b) by 120 days.

(21) Appl. No.: 16/973,820

(22) PCT Filed: May 28, 2019

(86) PCT No.: PCT/IL2019/050607
§ 371 (c)(1),
(2) Date: Dec. 10, 2020

(87) PCT Pub. No.: WO2019/239399
PCT Pub. Date: Dec. 19, 2019

(65) Prior Publication Data
US 2021/0265638 A1      Aug. 26, 2021

(30) Foreign Application Priority Data

Jun. 12, 2018   (IL) .......................................... 259978

(51) Int. Cl.
*H01M 4/86* (2006.01)
*H01M 4/88* (2006.01)
(Continued)

(52) U.S. Cl.
CPC ....... *H01M 4/8657* (2013.01); *H01M 4/8807* (2013.01); *H01M 4/8825* (2013.01);
(Continued)

(58) Field of Classification Search
None
See application file for complete search history.

(56) References Cited

U.S. PATENT DOCUMENTS

| 3,692,569 A | 9/1972 | Grot et al. |
| 5,318,863 A * | 6/1994 | Dhar ................... H01M 8/1007 |
| | | 429/513 |

(Continued)

FOREIGN PATENT DOCUMENTS

| EP | 1702669 A1 | 9/2006 |
| FR | 289233 A1 | 4/2007 |

(Continued)

OTHER PUBLICATIONS

International Search Report of PCT Application No. PCT/IL2019/050607 dated Sep. 24, 2019.
Extended European Search Report for EP Application No. EP19820006.5, dated Mar. 16, 2022.

*Primary Examiner* — Jonathan Crepeau
(74) *Attorney, Agent, or Firm* — Pearl Cohen Zedek Latzer Baratz LLP

(57) ABSTRACT

A method of making an alkaline membrane fuel cell assembly is disclosed. The method may include: depositing a first catalyst layer on a first gas diffusion layer to form a first gas diffusion electrode; depositing a second catalyst layer one a second gas diffusion layer to form a second gas diffusion electrode; depositing a thin membrane on at least one of: the first catalyst layer and the second catalyst layer; joining together the first and second gas diffusion electrodes to form the alkaline fuel cell assembly such that the thin membrane is located between the first and second catalyst layers; and sealing the first and second gas diffusion layers, the first and second catalyst layers and the thin membrane from all sides.

14 Claims, 3 Drawing Sheets

(51) Int. Cl.
*H01M 8/0271* (2016.01)
*H01M 8/083* (2016.01)
*H01M 8/1004* (2016.01)
*H01M 8/1086* (2016.01)
*H01M 8/1072* (2016.01)
*H01M 8/1046* (2016.01)

(52) U.S. Cl.
CPC ....... *H01M 4/8892* (2013.01); *H01M 8/0271* (2013.01); *H01M 8/083* (2013.01); *H01M 8/1004* (2013.01); *H01M 8/1072* (2013.01); *H01M 8/1093* (2013.01); *H01M 8/1046* (2013.01)

(56) References Cited

U.S. PATENT DOCUMENTS

| | | | | |
|---|---|---|---|---|
| 6,946,210 B2* | 9/2005 | Osenar | ................ | H01M 8/0271 429/514 |
| 2010/0291462 A1* | 11/2010 | Thate | ................ | H01M 8/1004 429/535 |
| 2012/0321973 A1 | 12/2012 | Gottesfeld et al. | | |
| 2013/0273453 A1* | 10/2013 | Dekel | ................ | H01M 8/1004 429/480 |

FOREIGN PATENT DOCUMENTS

| | | |
|---|---|---|
| WO | WO/2011/073652 A1 | 6/2011 |
| WO | WO/2011/121996 A1 | 10/2011 |
| WO | WO/2017/163244 A1 | 9/2017 |

\* cited by examiner

ALKALINE MEMBRANE FUEL CELL ASSEMBLY COMPRISING A THIN MEMBRANE AND METHOD OF MAKING SAME

CROSS-REFERENCE TO RELATED APPLICATIONS

This application is a National Phase Application of PCT International Application No. PCT/IL2019/050607, International Filing Date May 28, 2019, entitled: "ALKALINE MEMBRANE FUEL CELL ASSEMBLY COMPRISING A THIN MEMBRANE AND METHOD OF MAKING SAME", published on Dec. 19, 2019, under PCT International Application Publication No. WO 2019/239399, which claims the priority of Israel Patent Application No. 259978, filed on Jun. 12, 2018, which is hereby incorporated by reference in entirety.

FIELD OF THE INVENTION

The present invention generally relates to alkaline membrane fuel cell assemblies and method of making such assemblies. More particularly, the present invention relates alkaline membrane fuel cell assemblies that includes a thin membrane and method of making such assemblies.

BACKGROUND OF THE INVENTION

Membrane-electrode assemblies (MEAs) are the core components of proton-exchange membrane fuel cells (PEMFCs) and anion-exchange membrane fuel cells (AEMFCs). Generally, the membranes are manufactured separately from the electrodes. The electrodes, anode and cathode, are deposited either on the membrane itself, a membrane known in the art as catalyst-coated membrane (CCM). Alternatively, the catalyst layers can be deposited on gas-diffusion layers (GDLs) known in the art as gas diffusion electrodes (GDEs) that are further pressed against the membrane.

Electrolyte membranes are usually freestanding sheets of a few tens of microns thick. They are generally made of ionomer and a supporting mesh, i.e. a microporous substrate, for improving their mechanical properties. Mesh reinforcement also limits the membrane swelling upon water uptake. Freestanding non-supported membranes have also been demonstrated, but they are mechanically weaker and therefore are usually thicker in order to have sufficient mechanical strength. Some membranes were prepared by a multi-layer deposition of a sequence of GDL, first catalyst layer, membrane, second catalyst layer followed by a deposition of another GDL.

The membrane plays multiple roles within the fuel cell. First, it provides a gas-tight separation between the two electrodes. It also conducts ions and transfer water between the two electrodes. In order to limit ohmic losses and fuel cell dry-out, it is essential to have membranes having high ionic conductivity, which in turn depends from the quality of the ionomer material. Another way is to decrease the membrane thickness. However, it becomes increasingly difficult to manufacture freestanding membranes with thicknesses in the range of a few tens of microns or below. Successful approaches to manufacturer ultra-thin freestanding membranes involved the use of the supporting mesh with relatively low porosity such that the ionomer fraction within the membrane is significantly reduced. This in turn compromises the benefit of reducing the thickness. At such low thicknesses, non-supported membranes do not exhibit sufficient mechanical strength to be form as freestanding membranes for use as fuel cell separator.

Therefore, there is a strong interest to make MEAs with very thin membranes while conserving a relatively high fraction of the ionomer. This would allow benefiting from the geometrical effect without compromise the intrinsic ionic conductivity of the membrane.

SUMMARY OF EMBODIMENTS OF THE INVENTION

Some aspects of the invention are related to a method of making an alkaline membrane fuel cell assembly. Embodiments of the method may include: depositing a first catalyst layer on a first gas diffusion layer to form a first gas diffusion electrode; depositing a second catalyst layer one a second gas diffusion layer to form a second gas diffusion electrode; depositing a thin membrane on at least one of: the first catalyst layer and the second catalyst layer; and joining together the first and second gas diffusion electrodes to form the alkaline fuel cell assembly such that the thin membrane is located between the first and second catalyst layers. In some embodiments, the total thickness of the thin membrane may be below 30 microns.

In some embodiments, joining together may include at least one of: mechanically pressing together the first and second gas diffusion electrodes and physico-chemical bonding that includes crosslinking the joined area. In some embodiments, at least one of the first gas diffusion layer and the second gas diffusion layer may include a microporous layer. In some embodiments, the method may further include: depositing a first portion of the thin membrane on the first catalyst layer; and depositing a second portion of the thin membrane on the second catalyst layer. In some embodiments, joining together the first and second gas diffusion electrodes comprises joining the first and second portions of the thin membrane. In some embodiments, the method may further include: crosslinking the thin membrane to at least one of the first catalyst layer and the second catalyst layer prior to joining.

In some embodiments, the method may further include functionalizing the thin membrane prior to joining. In some embodiments, depositing the thin membrane may include depositing a dispersion comprising monomers or functionalized monomers and the method may further include: polymerizing the monomers or polymerizing the functionalized monomers. In some embodiments, depositing the thin membrane may include depositing a dispersion comprising polymerized polymer chains. In some embodiments, the dispersion further may include reinforcing nanoparticles. In some embodiments, the method may further include wetting the thin membrane by a base followed by dionized water, to cause ion-exchanging of anions in the membrane into anions, prior to the joining.

In some embodiments, the method may include sealing the alkaline fuel cell assembly. In some embodiments, the method may include sealing the alkaline membrane fuel cell assembly from all sides substantially perpendicular to surfaces of the first and the second gas diffusion electrodes. In some embodiments, the sealing may include adding gaskets to the sides substantially perpendicular to surfaces of the first and the second gas diffusion electrodes. In some embodiments, the sealing may include infusing a sealing material from all the sides substantially perpendicular to of the first and the second gas diffusion electrodes.

In some embodiments, depositing the thin membrane may include depositing two or more layers each comprising a different ionomer. In some embodiments, the ionomers are different by at least one of: the chemical composition and/or the ion-exchange capacity (IEC).

Some additional aspects of the invention may be related to an alkaline fuel cell assembly. Embodiments of the alkaline fuel cell assembly may include: a first gas diffusion layer coated with a first catalyst layer to form a first gas diffusion electrode; a second gas diffusion layer coated with a second catalyst layer to form a second gas diffusion electrode; and a thin membrane coated on at least one of: the first catalyst layer and the second catalyst layer, alkaline fuel cell assembly the first and second gas diffusion electrodes may be joined together to form the alkaline fuel cell assembly such that the thin membrane is located between the first and second catalyst layers. In some embodiments, the total thickness of the thin membrane may be at most 30 microns.

In some embodiments, the joined area may include at least one of: mechanically pressed area and crosslinking chemical bonds. In some embodiments, at least one of the first gas diffusion layer and the second gas diffusion layer may include a microporous layer. In some embodiments, a first portion of the membrane may coated the first catalyst layer and a second portion of the membrane may coat the second catalyst layer.

In some embodiments, the joined area may join the first and second portions of the membrane. In some embodiments, the alkaline fuel cell assembly may further include a seal for sealing the alkaline membrane fuel cell assembly. In some embodiments, the alkaline fuel cell assembly may further include a seal for sealing the alkaline membrane fuel cell assembly from all sides substantially perpendicular to surfaces of the first and the second gas diffusion electrodes. In some embodiments, the seal may include gaskets attached to the sides substantially perpendicular to surfaces of the first and the second gas diffusion electrodes. In some embodiments, the seal may include a sealing material infused on the sides substantially perpendicular to surfaces of the first and the second gas diffusion electrodes.

In some embodiments, the thin membrane may include ionomer and reinforcing nanoparticles.

Some other aspects of the invention may be related to a kit for forming alkaline fuel cell assembly. Embodiments of the kit may include: a first gas diffusion electrode coated with a first catalyst layer; a second gas diffusion electrode coated with a second catalyst layer; and a thin membrane coating at least one of: the first catalyst layer and the second catalyst layer. In some embodiments, the first and second gas diffusion electrodes may be configured to be joined together to form the alkaline fuel cell assembly such that the thin membrane is located between the first and second catalyst layers. In some embodiments, the total thickness of the thin membrane may be at most 30 microns.

Some other aspects of the invention may be related to a method of making an alkaline membrane fuel cell assembly. Embodiments of the method may include providing a first gas diffusion electrode comprising a first catalyst layer deposited on a first gas diffusion layer; providing a second gas diffusion electrode comprising a second catalyst layer deposited on a first gas diffusion layer; depositing a thin membrane on at least one of: the first catalyst layer and the second catalyst layer; and joining together the first and second gas diffusion electrodes to form the alkaline fuel cell assembly such that the thin membrane is located between the first and second catalyst layers. In some embodiments, the total thickness of the thin membrane is below 30 microns.

In some embodiments, joining together may include at least one of: mechanically pressing together the first and second gas diffusion electrodes and physico-chemical bonding that includes crosslinking the joined area. In some embodiments, at least one of the first gas diffusion layer and the second gas diffusion layer may include a microporous layer.

In some embodiments, the method may further include depositing a first portion of the thin membrane of the first catalyst layer; and depositing a second portion of the thin membrane of the second catalyst layer. In some embodiments, joining together the first and second gas diffusion electrodes may include joining the first and second portions of the thin membrane. In some embodiments, the method may further include crosslinking the thin membrane to at least one of the first catalyst layer and the second catalyst layer prior to joining. In some embodiments, the method may further include functionalizing the thin membrane prior to joining.

In some embodiments, depositing the thin membrane may include depositing a dispersion comprising monomers or functionalized monomers and the method further include polymerizing the monomers or polymerizing the functionalized monomers. In some embodiments, depositing the thin membrane comprises depositing a dispersion may include polymerized polymer chains. In some embodiments, the dispersion further comprises reinforcing nanoparticles. In some embodiments, the method may further include: wetting the thin membrane by a base followed by dionized water, to cause ion-exchanging of anions in the membrane into anions, prior to the joining. In some embodiments, the method may further include sealing the alkaline fuel cell assembly.

In some embodiments, the method may further include: sealing the alkaline membrane fuel cell assembly from all sides perpendicular to surfaces of the first and the second gas diffusion electrodes. In some embodiments, the sealing may include adding gaskets to the sides perpendicular to the non-deposited surfaces. In some embodiments, the sealing may include infusing a sealing material from all the sides perpendicular to the non-deposited surfaces. In some embodiments, depositing the thin membrane may include depositing two or more layers each comprising a different ionomer. In some embodiments, the ionomers are different by at least one of: the chemical composition and/or the ion-exchange capacity (IEC).

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figures 1A, 1B:
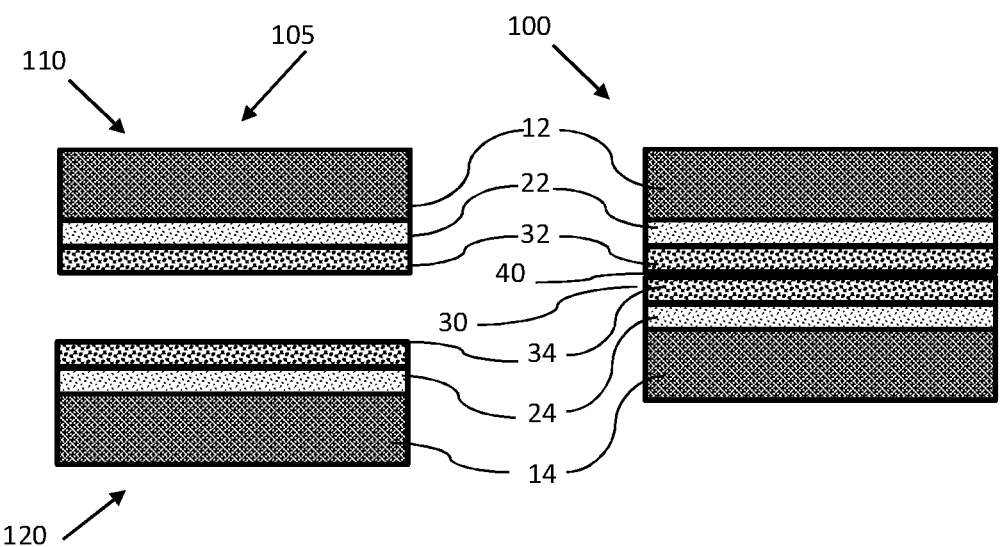
FIGS. 1A and 1B are illustrations of a kit for assembling alkaline fuel cell assembly and a fuel cell assembly according to some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However, it will be understood by those skilled in the art that the invention may be practiced without these specific details. In other instances, well-known methods, procedures, and components modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Some aspects of the present invention may be related to methods of making an alkaline membrane fuel cell assembly that include a thin membrane (e.g., having a thickness of less than 30 microns). In such fuel assembly the thin membrane may be deposited directly on at least one catalyst layer as oppose to the standard methods wherein the catalyst layers are deposited on both sides of the membrane to form a CCM. Such a method may allow to reduce the thickness of the membrane to well below 30 microns, for example, below 20 micron, 10 microns and 5 microns. Such a thin membrane may have several advantages, for example, dramatic reduction of the swelling phenomenon and the redundancy of the use of mesh as a support, as well as high conductance of the membrane (conductance is conductivity divided by thickness) and higher water permeation.

Furthermore, a method of making such an alkaline membrane fuel cell assembly according to some embodiments of the invention may allow better, simpler and cheaper production of AEMFC assemblies. The method may include preparing or providing an anode gas diffusion electrode (GDE which is an anode catalyst layer deposited on a GDL) and a cathode GDE (cathode catalyst layer deposited on a GDL) following by depositing the thin membrane on one or both catalyst layers of the GDEs and then joining the two GDEs together. GDEs are cheaper than the more expensive CCM. Embodiments of such method may allow wetting the thin membrane by a base followed by deionized water, to cause ion-exchanging of anions in the membrane, before the joining. This may allow simpler, quicker and more uniform ion-exchanging process in the membrane. In some embodiments, the two GDEs in which at least one is deposited with the thin membrane may be stored as a kit to be joined and optionally ion-exchanged when needed.

Reference is now made to FIGS. 1A and 1B which are illustrations of a kit for forming alkaline fuel cell assembly and a fuel cell assembly according to some embodiments of the invention. In some embodiments, a kit 105 for alkaline fuel cell assembly and a fuel cell assembly 100 may include a first gas diffusion electrode 110 and a second gas diffusion electrode 120. First gas diffusion electrode 110 may include a first gas diffusion layer 12 coated with a first catalyst layer 22 and second gas diffusion electrode 120 may include a second gas diffusion layer 14 coated with a second catalyst layer 24. In some embodiments, fuel cell assembly 100 and/or kit 105 may further include a thin membrane 30 coated on at least one of: a first catalyst layer 22 and a second catalyst layer 24. For example, a first portion 32 of thin membrane 30 may be coated on first catalyst layer 22 and a second portion 34 of thin membrane 30 may be coated on second catalyst layer 24.

Gas diffusion layers (GDL)s 12 and 14 may include any gas diffusion layers known in the art, for example, carbon paper, non-woven carbon felt, woven carbon cloth and the like. In some embodiments, GDLs 12 or 14 may include a microporous layer (MPL), that is made, for example, from sintered carbon/PTFE particles. In some embodiments, GDLs 12 and/or 14 may include the MPL is in order to provide a flat substrate to form a uniform deposition of the catalyst layer, First catalyst layer 22 may be, for example, an anode catalyst layer that includes ionomer and anode catalyst particles, such as, nanoparticles of: Pt, Ir, Pd, Ru, Ni and the like and alloys of the like. Second catalyst layer 24 may be, for example, a cathode catalyst layers, that includes ionomer and cathode catalyst particles, for example, nanoparticles of: Ag, Ag alloyed with Pd, Cu, Zr and the like. The ionomer included in first catalyst layer 22 and second catalyst layer 24 may be ionomer configured to conduct anions. The ionomers of first catalyst layer 22 and second catalyst layer 24 may be different or may be the same. In some embodiments, ionomers of first catalyst layer 22 and second catalyst layer 24 may be the same as the ionomer of first portion 32 and second portion 34 of thin membrane 30.

In some embodiments, first portion 32 and second portion 34 of thin membrane 30 may include any anion conducting ionomer known in the art, for example, copolymers of (Vinylbenzyl)trimethylammonium chloride, copolymers of diallyldimethylammonium chloride (DADMAC), styrene based polymer having quaternary ammonium anion conducting group, Bi-Phenyl backboned with two functional groups: an alkene tether group and alkyl halide group, and the like. In some embodiments, the total thickness of thin membrane 30 may be at most 30 microns, for example, at most 20 microns, at most 10 microns and at most 5 microns. In some embodiments, first portion 32 and second portion 34 may further include reinforcing nanoparticles, for increasing the strength of thin membrane 30. For example, the ionomer of thin membrane 30 may be reinforced with, for example, anionic clays, cationic clays, graphene oxide, reduced graphene oxide, zirconium oxide, titanium oxide, polytetrafluoroethylene nanoparticles, boron nitride and the like.

In some embodiments, first gas diffusion electrode 110 and second gas diffusion electrode 120 may be joined together to form alkaline fuel cell assembly 100 such that thin membrane 30 may be located between the first and second catalyst layers 22 and 24. In some embodiments, alkaline fuel cell assembly 100 may include a joined area 40, joining together first gas diffusion electrode 110 and second gas diffusion electrode 120. In some embodiments, joined area 40 may include at least one of: mechanically pressed area and crosslinking chemical bonds.

Figures 2A, 2B:
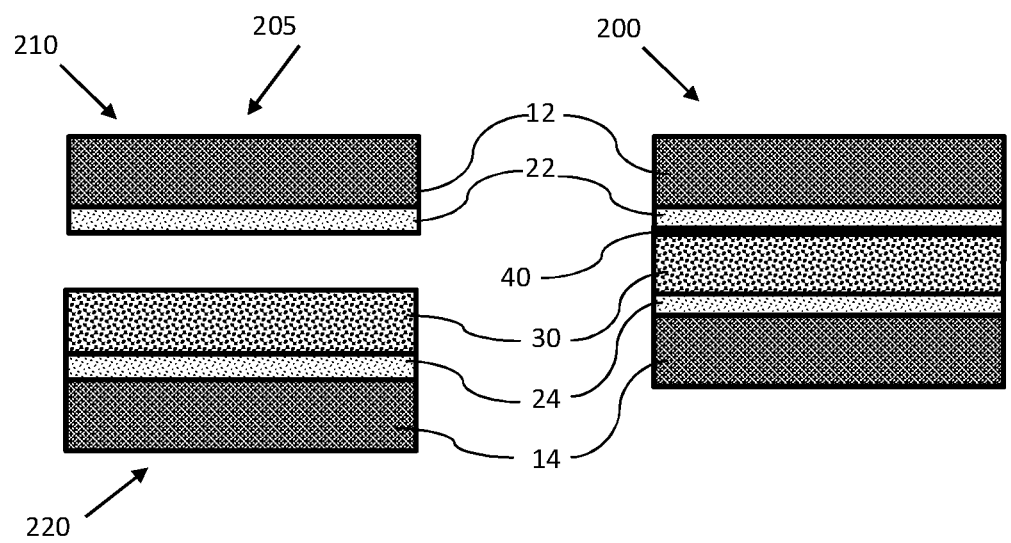
FIGS. 2A and 2B are illustrations of a kit for assembling alkaline fuel cell assembly and a fuel cell assembly according to some embodiments of the invention.

Reference is now made to FIGS. 2A and 2B which are illustrations of a kit for forming alkaline fuel cell assembly and a fuel cell assembly according to some embodiments of the invention. In some embodiments, a kit 205 of an alkaline fuel cell assembly and a fuel cell assembly 200 may include a first gas diffusion electrode 210 and a second gas diffusion electrode 220. First gas diffusion electrode 110 may include a first gas diffusion layer 12 coated with a first catalyst layer 22 and second gas diffusion electrode 120 may include a second gas diffusion layer 14 coated with a second catalyst layer 24. In some embodiments, fuel cell assembly 200 may further include a thin membrane 30 coated on a second catalyst layer 24.

First gas diffusion electrode 210 and second gas diffusion electrode 220 may be substantially the same and may include the same layers as first gas diffusion electrode 110 and second gas diffusion electrode 120 of assembly 100 of FIGS. 1A and 1B.

In some embodiments, thin membrane 30 may include any anion conducting ionomer known in the art, for example, copolymers of (Vinylbenzyl)trimethylammonium chloride, copolymers of diallyldimethylammonium chloride (DADMAC)), styrene based polymer having quaternary ammonium anion conducting group, Bi-Phenyl backboned with two functional groups: an alkene tether group and alkyl halide group, and the like. In some embodiments, the total thickness of thin membrane 30 may be at most 30 microns, for example, at most 20 microns, at most 10 microns and at most 5 microns. In some embodiments, thin membrane 30 may further include reinforcing nanoparticles, for increasing the strength of thin membrane 30. For example, the ionomer of thin membrane 30 may be reinforced with, for example, anionic clays, cationic clays, graphene oxide, reduced graphene oxide, zirconium oxide, titanium oxide, polytetrafluoroethylene nanoparticles, boron nitride and the like.

In some embodiments, first gas diffusion electrode 210 and second gas diffusion electrode 220 may be joined together to form alkaline fuel cell assembly 200 such that thin membrane 30 may be located between the first and second catalyst layers 22 and 24. In some embodiments, alkaline fuel cell assembly 200 may include a joined area 40, joining together first gas diffusion electrode 210 and second gas diffusion electrode 220. In some embodiments, joined area 40 may include at least one of: mechanically pressed area and crosslinking chemical bonds.

Figure 3A:
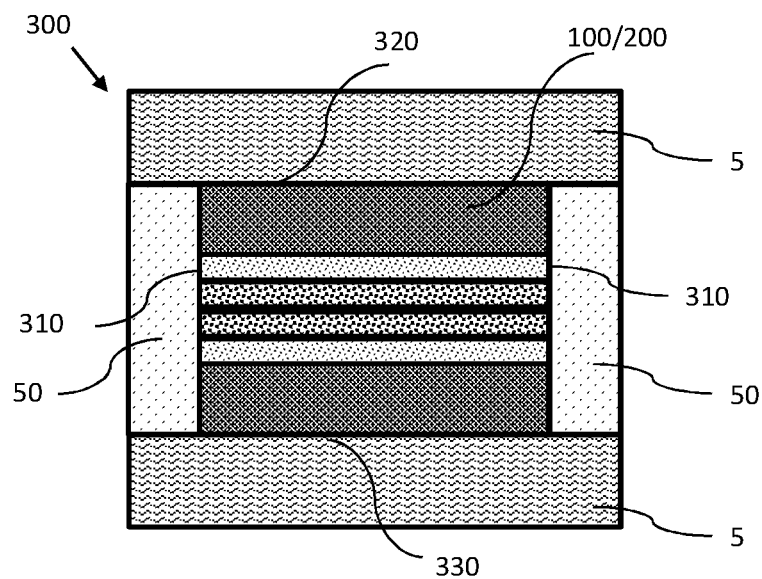
FIGS. 3A-3C are illustrations of sealed fuel cell assemblies according to some embodiments of the invention.
Figure 3B:
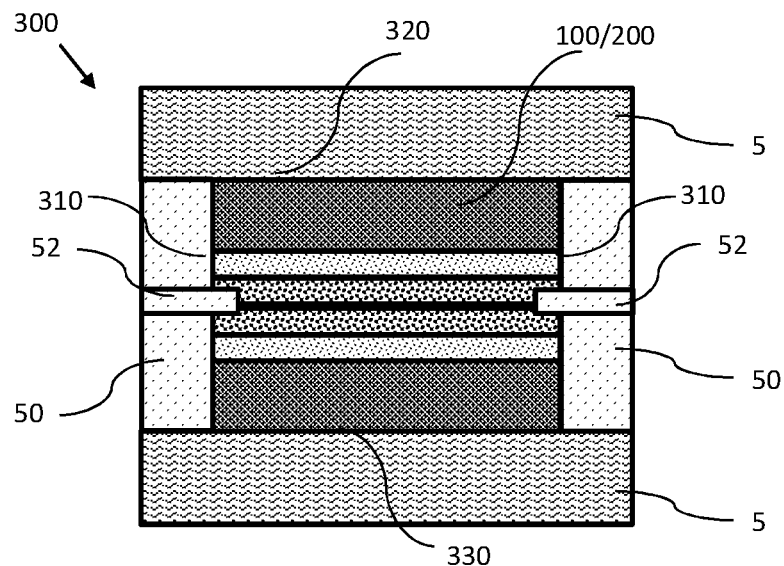
Figure 3C:
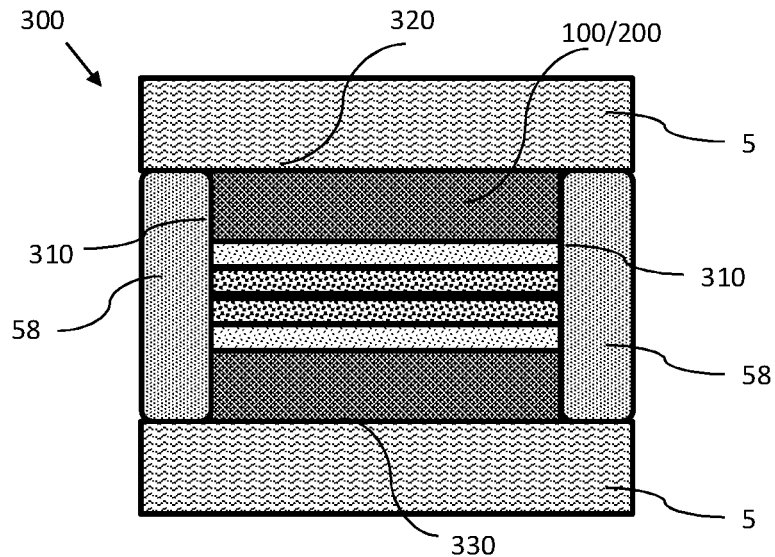

Reference are now made to FIGS. 3A-3C which are illustrations of sealed fuel cell assemblies according to some embodiments of the invention. In some embodiments, fuel cell assemblies 100 or 200 may further include a seal 50, 52, 58 for sealing the electro-chemically active areas of alkaline membrane fuel cell assembly. As used herein the electro-chemically active areas are areas at which electro-chemical reactions and ion conduction is taking place. In some embodiments, the electro-chemically active areas may include the GDLs, the catalyst layers and the membrane. In some embodiments, the seal may be configured to seal fuel cell assemblies 100 or 200 from all sides 310 substantially perpendicular to surfaces 320 and 330 of first and the second gas diffusion electrodes 110 and 120. In some embodiments, the seal may also be held between two flow fields 5.

In some embodiments, the seal may include two or more gaskets 50, as illustrated in FIG. 3A. Gaskets 50 may include any flexible sealing material that may be configured to fit (optionally under pressure) and fill the entire space from all sides 310 substantially perpendicular to surfaces 320 and 330 of first and the second gas diffusion electrodes 110 and 120 (I don't see 120 in FIG. 3). For example, gaskets 50 may include any type of elastomers either thermoset or thermoplastic, for example, SBS, SEBS, thermoplastic polyurethanes, fluoro-elastomers, SBR, NBR, EDPM, BR, epichlorohydrin, silicone rubbers, fluorinated thermoset rubbers, thermoset polyurethanes and the like. In some embodiments, at least one of the two or more gaskets 50 may include a ridged material, for example, Kapton (polyimide), PTFE and the like.

In some embodiments, additional sub gaskets 52 may be added to further seal the chemically active areas, as illustrated in FIG. 3B. Sub-gaskets may further seal the active area. For example, sub-gaskets 52 may include any type of sealing material either elastic or rigid. In some embodiments, the sub-gaskets may be made from the same material as gaskets 50. In some sub-gaskets 52 may be made from a rigid material, for example, Kapton (polyimide), PTFE and the like.

In some embodiments, a sealing material 58 may be infused to seal fuel cell assemblies 100 or 200 from all sides 310 substantially perpendicular to surfaces 320 and 330 of first and the second gas diffusion electrodes 110 and 120. Sealing material 58, may be any flowable material that can be infused to completely fill the entire space from all sides 310. Sealing material 58 may include a silicone-based polymer, for example, a thermoset silicone rubber, a thermoplastic such as polyurethane and the like.

Figure 4:
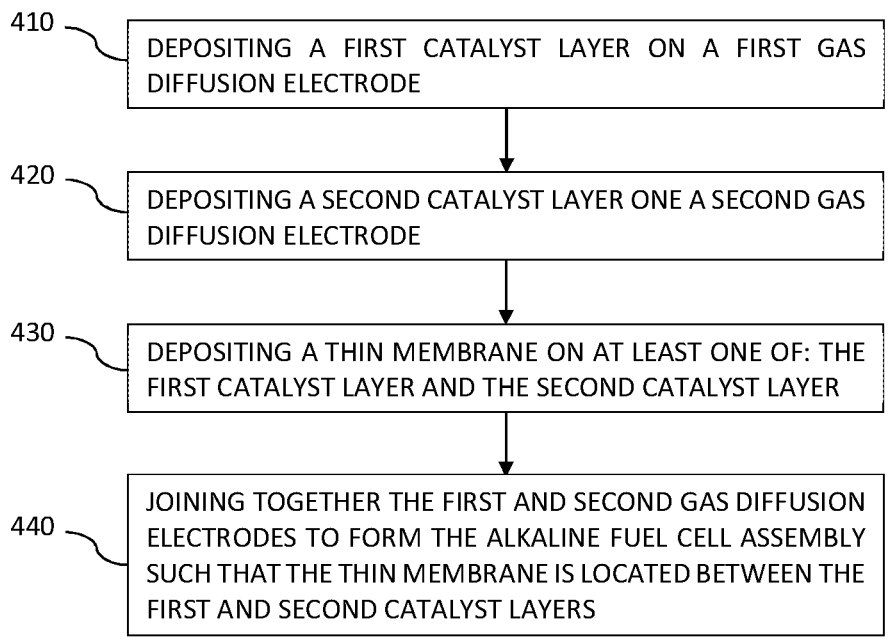
FIG. 4 is a flowchart of a method of making an alkaline membrane fuel cell assembly according to some embodiments of the invention.

Reference is now made to FIG. 4 which is a flowchart of a method of making an alkaline membrane fuel cell assembly. In some embodiments, in box 410, a first catalyst layer (e.g., an anode catalyst layer) may be deposited on a first gas diffusion layer to form a first gas diffusion electrode (GDE). In some embodiments, a first GDE 110 may already be provided with first catalyst layer 22 deposited on GDL 12. In some embodiments, GDL 12 may be provided and catalyst layer 22 may be deposited on one surface of GDL 12, using any known method, for example, spraying, electrospray coating, slot die casting, printing and the like.

In some embodiments, in box 420, a second catalyst layer (e.g., a cathode catalyst layer) may be deposited on a second gas diffusion layer to form a second gas diffusion electrode (GDE). In some embodiments, a second GDE 120 may already be provided with second catalyst layer 24 deposited on second GDL 14. In some embodiments, GDL 14 may be provided and catalyst layer 24 may be deposited on one surface of GDL 14, using any known method, for example, spraying, electrospray coating, slot die casting, printing and the like.

In some embodiments, in box 430, a thin membrane may be deposited on at least one of: the first catalyst layer and the second catalyst layer. For example, thin membrane 30 may be deposited on at least one of first catalyst layer 12 of GDE 210 or second catalyst layer 14 of GDE 220 (as illustrated in FIG. 2A). Alternatively, first portion 32 of thin membrane 30 may be deposited on the first catalyst layer and second portion 34 of thin membrane 30 may be deposited on second catalyst layer 14 (as illustrated in FIG. 1A). In some embodiments, a dispersion for forming the thin membrane may be deposited using any known method, for example, spraying, electrospray coating, slot die casting, printing and the like. The dispersion may include monomers that may or may not include functional groups for forming the ionomer (functionalized monomers). Some examples of functional monomers may include, Vinylbenzyl)trimethylammonium chloride, dimethylammonium chloride (DADMAC) and the like. Some examples of functional or non-functional co-monomers may include, styrene, divinyl benzene, isoprene, butadiene, acrylamide and the like. The monomers may then be polymerized following the deposition. Alternatively, the dispersion may include already polymerized polymer chains either with or without functional groups, for example, Poly (vinyl benzene chloride) and its copolymers, poly(vinylbenzyl)trimethylammonium chloride) and its copolymers, poly (diallyldimethyl ammonium chloride) and the like. In some embodiments, if the monomers or polymers in the dispersion are not functionalized, embodiments may include functionalizing the deposited membrane. For example, transforming a chloromethylated group (non-functional) to a trimethylammonium group (functional), following by adding trimethylamine (TMA) to cause a chemical reaction is known in the art as "quaternization".

In some embodiments, depositing the thin membrane may include depositing two or more layers each comprising a different ionomer. In some embodiments, the ionomers may be different by at least one of: the chemical composition and/or the ion-exchange capacity (IEC). For example, two different types of ionomers may be deposited to form thin membrane 30 for example, using any two of the materials disclosed with respect to box 430. Additionally or alternatively, the same ionomer may be deposited having different IEC (the concentration of functional groups in the polymer). For example, an ionomer having a lower IEC (e.g., 0.2-6 mmol/gr) may be deposited at the anode side, for example, at first portion 32 of thin membrane 30 and an ionomer having a higher IEC (e.g., 0.2-6 mmol/gr) may be deposited at the cathode side, for example, at second portion 34 of thin membrane 34.

In some embodiments, the polymers in the thin membrane may further be crosslinked using any suitable crosslinking agent, for example, Divinylbenzene, N,N,N',N'-Tetramethyl-1,6-hexanediamine (TMHDA), 1,4-diazabicyclo[2.2.2]octane (DABCO), glyoxal, glutaraldehyde, hydrocarbon chains, sulfur groups, siloxy groups, N-hydroxybenzotriazole groups, azide groups and the like. As should be understood by one skilled in the art the crosslinking agent may be selected according to the type of the ionomer to be crosslinked. Additionally or alternatively, thin membrane 30 may be crosslinked to at least one of first catalyst layer 22 and second catalyst layer 24.

In some embodiments, in box 440, the first and second gas diffusion electrodes may be joined together to form the alkaline fuel cell assembly such that the thin membrane is located between the first and second catalyst layers. For example, GDE 210 may be joined to GDE 220 having thin membrane 30 deposited thereon (as illustrated in FIGS. 2A and 2B). Alternatively, first portion 32 of thin membrane 30 and second portion 34 of thin membrane 30 may be joined together (as illustrated in FIGS. 1A and 1B), the two GDEs may be joined by at least one of: mechanically pressing together the first and second gas diffusion electrodes and physico-chemical bonding that includes crosslinking the joined area. The two GDEs may be pressed together either with or without an additional heat. Alternatively, the two GDEs may be attached to each other and then crosslinked by adding a crosslinking agent to the thin membrane dispersion. As should be understood by one skilled in the art, the two joining method disclosed are given as examples only and the invention as a whole is not limited to a specific from of joining.

In some embodiments, the method may further include wetting the thin membrane by a base followed by dionized water, to cause ion-exchanging of anions in the membrane into anions, prior to the joining. In some embodiments, the anions to be exchanged may include $OH^-$, $HCO_3^-$, $CO_3^{2-}$, and the like. Some examples for such bases may include sodium hydroxide (NaOH), potassium hydroxide (KOH), sodium carbonate ($Na_2CO_3$), potassium carbonate ($K_2CO_3$), sodium bicarbonate ($NaHCO_3$), potassium bicarbonate ($KHCO_3$) and the like.

In some embodiments, the method may further include sealing the alkaline membrane fuel cell assembly from all sides substantially perpendicular to surfaces of the first and the second gas diffusion electrodes. In some embodiments, sealing may include adding gaskets to the sides perpendicular to surfaces 320 and 330. In some embodiments, sealing may include infusing a sealing material from all the sides substantially perpendicular to of the first and the second gas diffusion electrodes Unless explicitly stated, the method embodiments described herein are not constrained to a particular order in time or chronological sequence. Additionally, some of the described method elements may be skipped, or they may be repeated, during a sequence of operations of a method.

Various embodiments have been presented. Each of these embodiments may of course include features from other embodiments presented, and embodiments not specifically described may include various features described herein.

The invention claimed is:

1. A method of making an alkaline membrane fuel cell assembly, the method comprising:
    depositing a first catalyst layer on a first gas diffusion layer to form a first coated gas diffusion electrode;
    depositing a second catalyst layer on a second gas diffusion layer to form a second coated gas diffusion electrode;
    depositing a thin membrane on at least one of: the first catalyst layer and the second catalyst layer;
    joining together the first and second coated gas diffusion electrodes to form the alkaline fuel cell assembly such that the thin membrane is located between the first and second catalyst layers; and
    sealing the first and second gas diffusion layers, the first and second catalyst layers and the thin membrane from all sides,
    wherein the total thickness of the thin membrane is below 30 microns.

2. The method of claim 1, wherein the joining together includes at least one of: mechanically pressing together the first and second coated gas diffusion electrodes and physico-chemical bonding that includes crosslinking the joined area.

3. The method of claim 1, wherein at least one of the first and the second coated gas diffusion layers comprises a microporous layer.

4. The method of claim 1, further comprising:
    depositing a first portion of the thin membrane on the first catalyst layer; and
    depositing a second portion of the thin membrane on the second catalyst layer, wherein joining together the first and second coated gas diffusion electrodes comprises joining the first and second portions of the thin membrane.

5. The method of claim 1, further comprising crosslinking the thin membrane to at least one of the first catalyst layer and the second catalyst layer prior to the joining.

6. The method of claim 1, further comprising functionalizing the thin membrane prior to the joining.

7. The method of claim 1, wherein the depositing of the thin membrane comprises depositing a dispersion comprising monomers or functionalized monomers and the method further comprises polymerizing the monomers or polymerizing the functionalized monomers.

8. The method of claim 1, wherein the depositing of the thin membrane comprises depositing a dispersion comprising polymerized polymer chains.

9. The method of claim 1, wherein the depositing of the thin membrane further comprises depositing ionomer and reinforcing nanoparticles.

10. The method of claim 1, further comprising sealing the alkaline membrane fuel cell assembly from all sides perpendicular to surfaces of the first and the second coated gas diffusion electrodes.

11. A method of assembling an alkaline membrane fuel cell assembly, the method comprising:
- depositing a thin membrane on at least one of (1) a first catalyst layer of a first coated gas diffusion electrode comprising the first catalyst layer deposited on a first gas diffusion layer and (2) a second catalyst layer of a second coated gas diffusion electrode comprising the second catalyst layer deposited on a second gas diffusion layer;
- joining together the first and second coated gas diffusion electrodes to form the alkaline fuel cell assembly such that the thin membrane is located between the first and second catalyst layers; and
- sealing the first and second coated gas diffusion layers, the first and second catalyst layers and the thin membrane from all sides,
- wherein the total thickness of the thin membrane is below 30 microns.

12. The method of claim 11, wherein joining together comprises at least one of: mechanically pressing together the first and second coated gas diffusion electrodes and physicochemical bonding that includes crosslinking the joined area.

13. The method of claim 12, wherein at least one of the first and the second coated gas diffusion layers comprises a microporous layer.

14. The method of claim 12, further comprising:
- depositing a first portion of the thin membrane of the first catalyst layer; and
- depositing a second portion of the thin membrane of the second catalyst layer, wherein joining together the first and second coated gas diffusion electrodes comprises joining the first and second portions of the thin membrane.

* * * * *